United States Patent [19]
Gleeson et al.

[11] Patent Number: 5,131,673
[45] Date of Patent: Jul. 21, 1992

[54] PALLETIZED LOAD SYSTEM TRAILER WITH AUTOMATIC FLATRACK LOCKDOWN DEVICE

[75] Inventors: Paul Gleeson, Ballwin; Stephen B. Hupperts, St. Charles; Tim R. Thorman, St. Louis, all of Mo.

[73] Assignee: Southwest Mobile Systems, Inc., St. Louis, Mo.

[21] Appl. No.: 637,371

[22] Filed: Jan. 4, 1991

[51] Int. Cl.⁵ .............................................. B63D 53/06
[52] U.S. Cl. ............................ 280/423.1; 280/DIG. 8; 296/35.3; 410/79
[58] Field of Search ............... 280/401, 423.1, 43.12, 280/DIG. 8, 149.2, 418.1, 474, 433; 296/35.3; 414/537; 410/55, 79, 80, 82, 83

[56] References Cited

U.S. PATENT DOCUMENTS

| 3,125,035 | 3/1964 | Loomis | 410/80 |
| 3,158,106 | 11/1964 | Clejan | 410/80 X |
| 3,431,017 | 3/1969 | Joseph | 410/80 |
| 3,439,821 | 4/1969 | Hand | 410/80 X |
| 3,692,353 | 9/1972 | Lynde | 296/35.3 |
| 4,114,718 | 9/1987 | Lipshield | 410/77 X |
| 4,353,565 | 10/1982 | Smith et al. | 280/149.2 |
| 4,915,567 | 4/1990 | Ellingsen | 410/77 X |

FOREIGN PATENT DOCUMENTS 2736222  2/1979  Fed. Rep. of Germany ..... 296/35.3

Primary Examiner—Charles A. Marmor
Assistant Examiner—Kevin Hurley
Attorney, Agent, or Firm—Polster, Lieder, Woodruff & Lucchesi

[57] ABSTRACT

An automatic, pneumatically operated flatrack lockdown device is provided for a palletized load system trailer. The lockdown device includes a manual release system which can override the pneumatic system when, for example, the pneumatic system fails. The release system includes a main handle, which when pivoted unlocks the flatrack. In one embodiment, the release system further includes a locking assembly which prevents the main handle from unlocking the flatrack, and a pair of release handles, each of which release the locking assembly to allow for operation of the main handle.

23 Claims, 4 Drawing Sheets

PALLETIZED LOAD SYSTEM TRAILER WITH AUTOMATIC FLATRACK LOCKDOWN DEVICE

BACKGROUND OF THE INVENTION

This invention relates to trailers for palletized load systems, and in particular, to an automatic lock down device for a flatrack carried by the trailer. While the invention is described with particularity in respect to its flatrack application, those skilled in the art will recognize the wider applicability of the inventive principles disclosed hereinafter.

The maneuverability of land forces and the equipment which those forces use require a faster, more efficient supply distribution method. Recognizing these requirements, a number of palletized load systems (PLS) have and are being developed for military use. Versions of the PLS have been used commercially in agricultural, cargo handling, and waste management applications for years with considerable success. The military adoptions of such systems, however, are generally more stringent than their commercial counterparts, and require safety and operational components not found in their civilian counterparts.

Palletized load systems generally consist of a truck and an associated trailer, either or both of which are designed to carry loads contained on flatracks. PLS trailers typically are flat trailers which are loaded in any convenient method, generally from the back of the truck, which in certain applications includes a mechanism for loading the flatrack. When the trailer and truck are operated in tandem, the flatrack to be carried by the trailer is first brought up on to the bed of the truck and then moved to the trailer. Because the bed of the trailer is flat, the trailer must include a mechanism to lock the flatrack to the trailer during transportation and use. In military requirements, that means the trailer likely will operate off the road, in varying terrains.

Lock down devices are known in the prior art. While these devices work well, they generally are not adaptable to military requirements for a number of reasons. The reasons include the fact that the mechanisms are not intended to operate in the severe applications required for military use, or require specialized constructions not compatible with present military configurations for flatrack and trailer design.

SUMMARY OF THE INVENTION

One object of the invention is to provide an automatic locking system for a PLS trailer.

Another object of this invention is to provide a locking system for a PLS trailer which includes a manual override.

Another object of this invention is to provide a lock down device which eliminates the need for certain stops on a PLS trailer.

Another object of this invention is to provide a simplified lock down device which locks the flatrack to an associated trailer without any modifications to the flatrack design.

These and other objects will become apparent to those skilled in the art in light of the following description and accompanying drawings.

In accordance with this invention, generally stated, a palletized load system trailer is provided with a simple yet secure structure for automatically locking a flatrack to a trailer. The flatrack is removably mounted to the trailer which in turn is connected to a truck. The truck has a supply of pressurized air. The trailer includes a pneumatic system which is removably coupled to the truck's air supply to communicate therewith, a locking mechanism which automatically locks the flatrack to the trailer when the trailer is connected to the truck, and a manual release mechanism which releases the flatrack from the trailer.

The locking mechanism includes a pivotal hook which engages a latch plate of the flatrack and an air cylinder. The air cylinder has an extendable, retractible piston which is operatively connected to the hook such that when the air cylinder is pressurized, the piston extends and the hook is pivoted into engagement with the latch plate. The cylinder communicates with the trailer's pneumatic system such that when the pneumatic system is connected to the truck's air supply, the cylinder is automatically pressurized, thereby pivoting the hook upwardly into engagement with the latch plate. The air cylinder is preferably a double acting cylinder having a rear chamber which when pressurized extends the piston and a front chamber which when pressurized retracts the piston. The cylinder's rear chamber is connected to an air line of the pneumatic system.

The trailer further includes an air tank which communicates with the air line through a second air line which has a check valve therein. When the pneumatic system is connected to the truck's air supply, the check valve allows the tank to become pressurized. The tank also communicates with the cylinder's front chamber. A pilot valve is positioned between the tank and the front chamber. It is responsive to a signal created when the trailer's pneumatic system is connected to the truck's pneumatic system. The signal closes the pilot valve thereby preventing communication between the tank and the cylinder's front chamber. The pilot valve includes an actuator, which when pressed, opens the line of communication between the tank and the cylinder front chamber to pressurize the front chamber, thereby causing the hook to disengage from the latch plate.

In one embodiment, the hook comprises a J-shaped hook mounted to an axle positioned transversely to the longitudinal axis of the trailer. This hook prevents vertical movement of the flatrack. Because it does not prevent axial movement of the flatrack, the trailer also includes aft stops to prevent axial movement of the flatrack.

The manual release mechanism of this embodiment comprises a main handle connected to the axle to which the hook is mounted to rotate therewith, a locking cam fixed to the axle to rotate with the main handle, a release cam operated by a release handle and mounted on the axle for free rotation about the axle, and a locking mechanism which locks the main handle in place. When the release cam is rotated, the locking mechanism releases the locking cam, thereby allowing the main handle to rotate the hook out of engagement with the latch plate. The locking mechanism comprises a rod which is spring biased to be normally in locking contact with a flat face of the locking cam. The release cam includes a cam surface having a section of reduced diameter and a section of enlarged diameter. The locking mechanism contacts the reduced diameter section when it is in locking contact with the locking cam. As the release cam is rotated, the area of enlarged diameter comes into contact with the locking mechanism and pushes it out of engagement with the locking cam.

The release mechanism may also include a cable attached at one end to the locking mechanism and attached at another end to a second release handle which is pivotally secured to the trailer. When the second release handle is pivoted, the locking mechanism is pulled out of engagement with the locking cam, releasing the main handle so that it may be rotated to disengage the hook from the latch plate.

In a second embodiment, the hook comprises a pair of arms. Each arm includes a fixed end, a free end, and a head at the free end. The head has an aperture therethrough which is shaped and sized to fit over the latch plate. The aperture surrounds the latch plate upon engagement therewith to prevent horizontal and vertical movement of the flatrack. The arms are pivotally mounted to the trailer to pivot in a path perpendicular to the longitudinal axis of the trailer. The cylinder is pivotally connected at one end to one of the arms, and pivotally connected at another end to the other of the arms. When the cylinder piston is retracted, the hook is pulled out of engagement with the latch plate, and when the cylinder piston is extended, the hook is pivoted into engagement with the latch plates.

The manual release mechanism of this embodiment includes a main handle pivotally connected to a toggle clamp which is mounted to the trailer. The toggle clamp includes a rod which is movable between a retracted position and an extended position. When the handle is pivoted, the rod extends to push the hook out of engagement with the latch plates.

BRIEF DESCRIPTION OF THE DRAWINGS

FIG. 1A is a side elevational view of a PLS truck pulling the PLS trailer of FIG. 1, both of which have flatracks thereon;

DESCRIPTION OF THE PREFERRED EMBODIMENT

Figure 1:
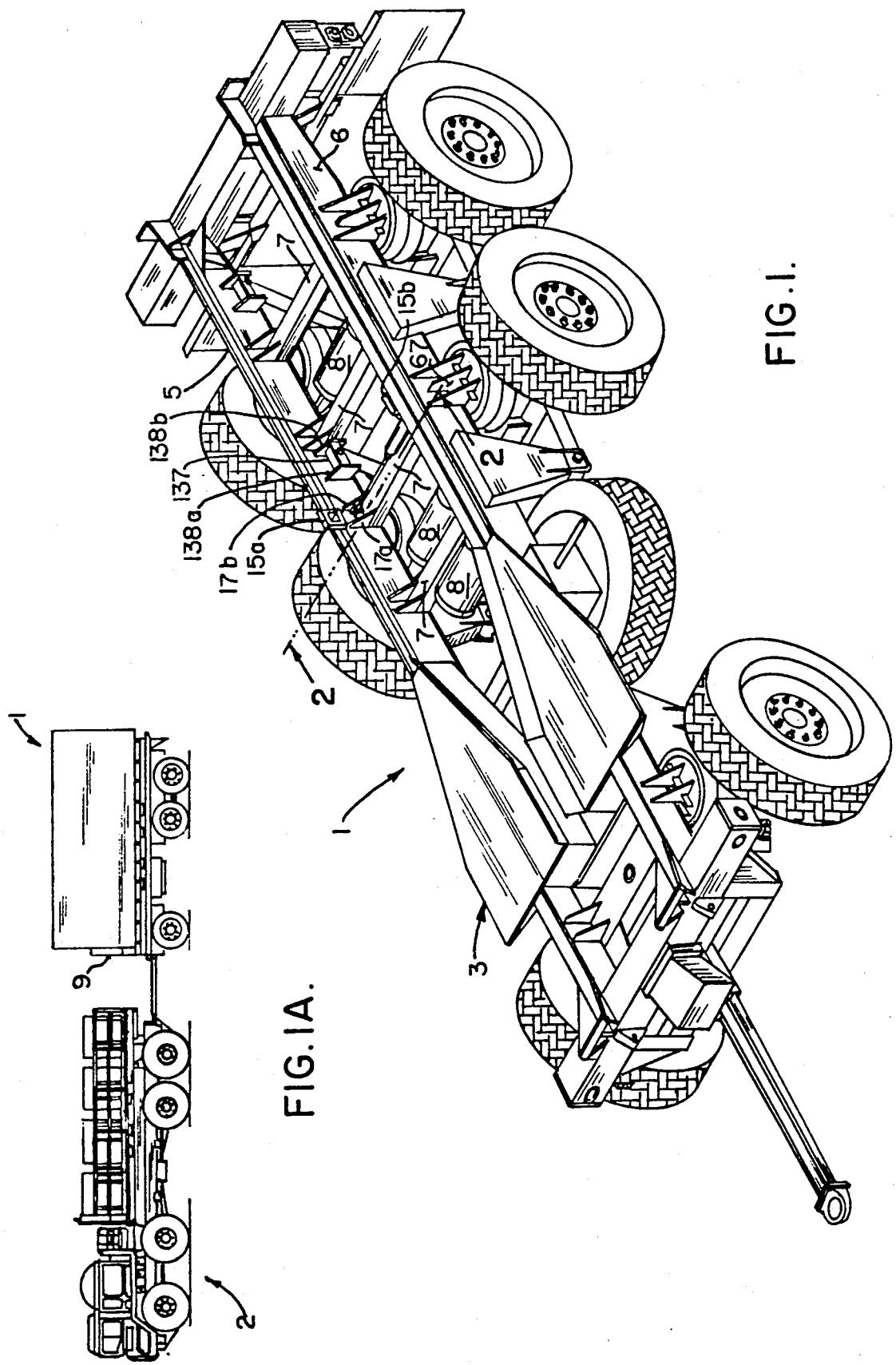
FIG. 1 is a perspective view of a palletized load system (PLS) trailer having a locking mechanism of the present invention.

Referring to the Figures, and in particular FIGS. 1-4, reference numeral 1 generally refers to a palletized load system (PLS) trailer which is pulled by a truck 2. Trailer 1 comprises a frame 3 having a longitudinally extending side rails 5 and 6 with a plurality of cross-beams 7 extending therebetween. A plurality of airtanks 8 are located between cross beams 7. A flatrack 9, carrying supplies to be transported, is carried on top of trailer 1. (FIG. 1A) Flatrack 9 is secured to trailer 1 by locking assembly 11 (FIG. 2) which interacts with a pair of flatrack latch plates 13 fixed to the underside of flatrack 9. There is one latch plate located on each side of flatrack 9. The location of locking assembly 11 on trailer 1 is determined by the location of latch plates 13 on flatrack 9.

More specifically, locking assembly 11 includes a pair of hooks 15a and 15b. Hooks 15a and 15b include arms 16 which are received between a pair of gussets 17a and 17b. (FIG. 3) Gussets 17a and 17b are mounted to the inside of each of the side rails 5 and 6, above one of the cross beams 7. (FIG. 1). A bolt 19 is journaled in apertures in gussets 17a and 17b and in bores 23a and 23b in the bottom of arms 16 (FIG. 3) to pivotally connect hook 15a to trailer 1. Hook 15b is similarly pivotally connected to trailer 1 opposite hook 15a. The bolt is secured with a locknut 25. As can be seen, hooks 15a and 15b pivot along a path transverse to the longitudinal axis of trailer 1.

Figure 4:
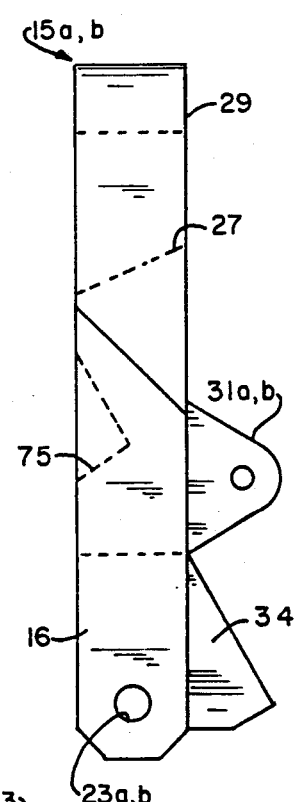
FIG. 4 is a side elevational view of the hook of FIG. 3.

When pivoted upwardly, an opening 27 in the head 29 of each hook 15a and 15b engages its associated latch plate 13 to hold flatrack 9 to trailer 1. Opening 27 has a tapered bottom edge, as seen in FIG. 4, so that it will fit about latch plate 13. Hooks 15a and 15b surround latch plates 13 on their front, back, top, and bottom sides and thus prevent vertical and horizontal movement of flatrack 9 during transportation.

Figure 2:
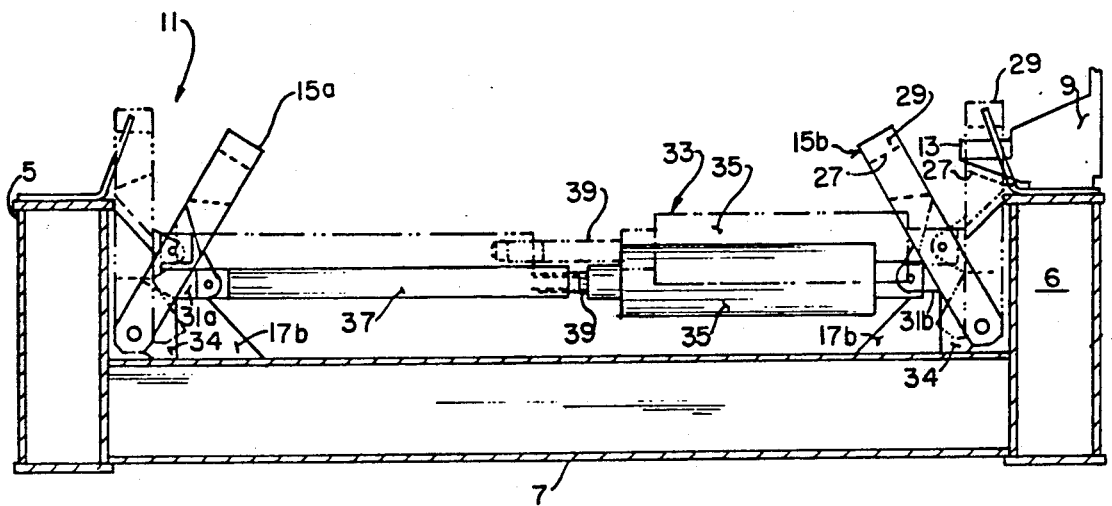
FIG. 2 is an elevational view of the locking assembly taken along line 2—2 of FIG. 1.
Figure 3:
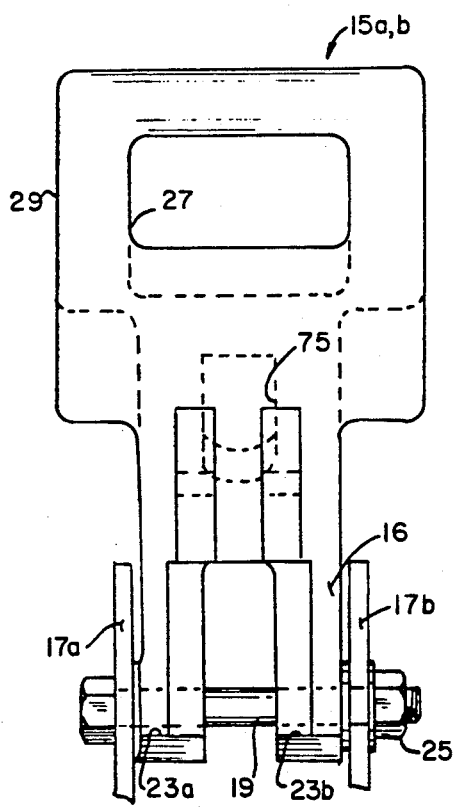
FIG. 3 is a front elevational view of a hook of the locking assembly.

Hooks 15a and b each include an ear 31a and 31b to allow pivotal connection of a pneumatic cylinder assembly 33 thereto. The cylinder 35 of assembly 33 is connected to one of ears 31a and 31b and an extension rod 37 is connected to the other of ears 31a and 31b. Extension rod 37 is fixed to the cylinder's piston rod 39. As shown in FIG. 2, when piston rod 39 is extended, hooks 15a and 15b are pivoted upwardly to engage latch plates 13. When they engage plates 13, flatrack 9 is locked to trailer 1. (Shown in phantom) Conversely, when piston rod 39 is retracted, the hooks 15a and b are pulled out of engagement with latch plate 13 thereby releasing flatrack 9.

The hooks also include stops 34 to prevent them from pivoting too far inward when latch plates 13 are released. If hooks 15a and 15b were pivoted to a point where they were parallel with cross-beam 7, the cylinder assembly 33 could not pivot the hooks. Stops 34 prevent this.

Figure 5:
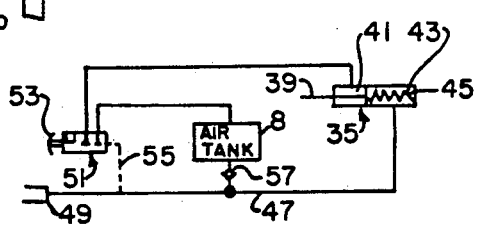
FIG. 5 is a pneumatic diagram of the locking assembly.

Turning to FIG. 5, cylinder 35 is a double acting cylinder having a front chamber 41 and a rear chamber 43. A spring 45 is in rear chamber 43. Rear chamber 43 is preferably connected to the trailer's emergency airline 47. Airline 47 is connected to a pressurized air supply of truck 2 by means of a glad hand 49. The truck's air supply is commonly 100 psi. A pilot valve 51 having an actuator 53 communicates with emergency air line 47 over a pilot line 55. Pilot valve 51 communicates with the front chamber 41 of cylinder 35 and with one of the tanks 8. Thus, when pilot valve 51 is open, air tanks 8 are in fluid communication with cylinder front chamber 41. Air tank 8 is connected to emergency line 47, with a check valve 57 interposed between tank 8 and line 47.

When glad hand 49 is connected to the air supply of truck 2, a signal is sent through pilot line 55 which closes pilot valve 51. When pilot valve 51 is closed, the air in tank 8 cannot flow to the front chamber 41 of cylinder 35. Air also flows to the rear chamber 43 of cylinder 35 to pressurize chamber 43 and extend piston 39, thereby locking flatrack 9 to trailer 1. Spring 45 biases piston rod 39 to an extended position. Thus, upon failure of the pneumatic system, hooks 15a and 15b will engage latchplates 13 to lock flatrack 9 to trailer 1.

To release flatrack 9, pilot valve 51 must be opened by actuator 53 to place tank 8 in communication with front chamber 41 of cylinder 35. When pilot valve 51 is opened, the air in tank 8 flows to chamber 41 and chamber 41 becomes pressurized. This, in turn causes piston 39 to retract, thereby unlocking flatrack 9.

Figure 6:
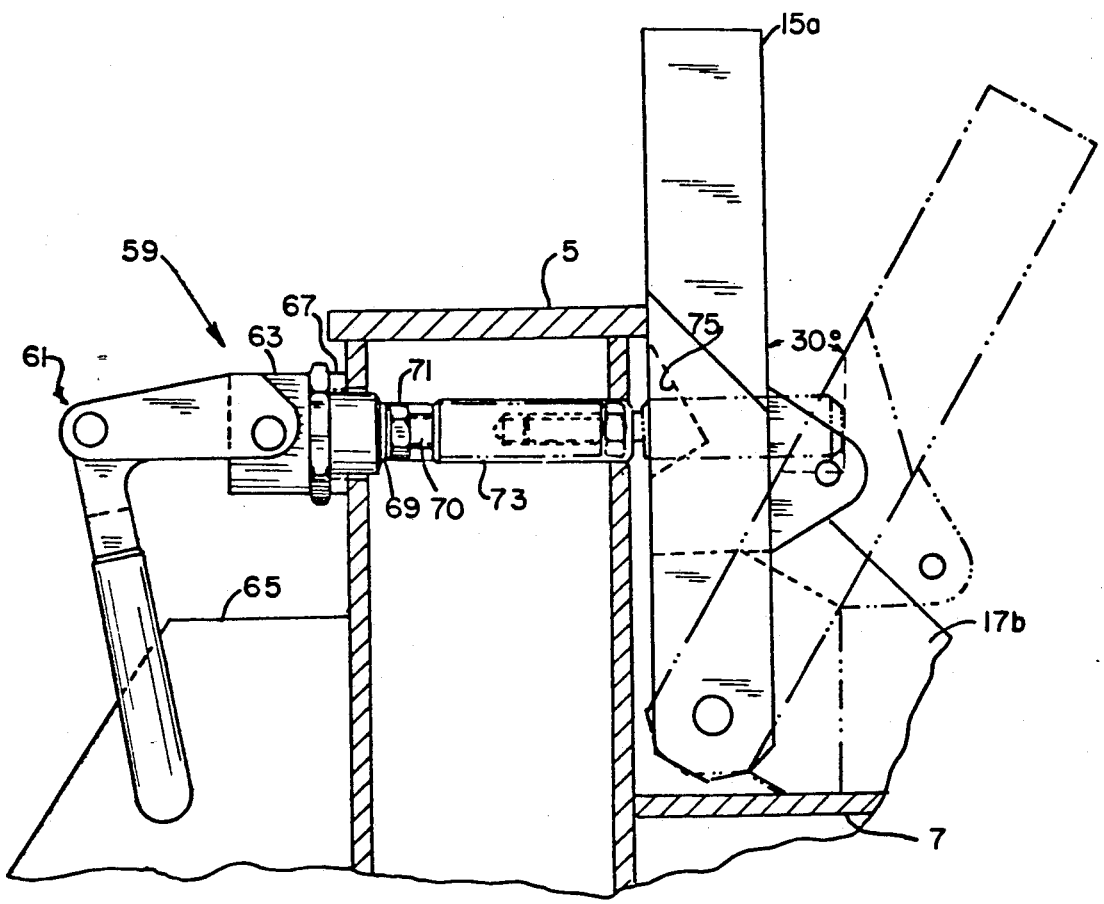
FIG. 6 is a fragmentary view of the trailer, partially in cross-section, showing a manual release assembly of the present invention.

Turning to FIG. 6, a manual release assembly 59 is provided to unlock flatrack 9 from trailer 1 when, for example, the pneumatic system fails. Assembly 59 includes a release handle 61 which is pivotally mounted on a toggle clamp 63. Clamp 63, in turn, is mounted to side rail 5 above an external gusset 65 by a clamp base 67. Toggle clamp 63 is a clamp such as is available from DE-STACO, located in Troy, Michigan, having catalogue No. DE-STA-CO Model 62A and is known in the art to include a linkage assembly (not shown) and a rod 69. Clamp 63 operates such that when handle 61 is pivoted upwardly, rod 69 extends, and when it is pivoted downwardly rod 69 retracts. Rod 69 is preferably counterbored to receive a threaded rod 70. Threaded rod 70 receives a jam nut 71 positioned adjacent rod 69 and an extension bar 73 at its end. Jam nut 71 is provided to calibrate release assembly 59 so that bar 73 is properly positioned to engage hook 15a upon extension of rod 69.

When rod 69 is extended by pivoting handle 61, extension bar 73 is forced against hook 15a to move the hook forward and out of engagement with latch plate 13. As hook 15b is operatively connected to hook 15a by means of cylinder assembly 33, hook 15b is also moved out of engagement with its associated latch plate. Thus, when handle 61 is pivoted, flatrack 9 is released from trailer 1. Hook 15a preferably includes a cavity 75 (shown as a notted line in FIGS. 3, 4, and 6) into which extension bar 73 extends.

Figure 8:
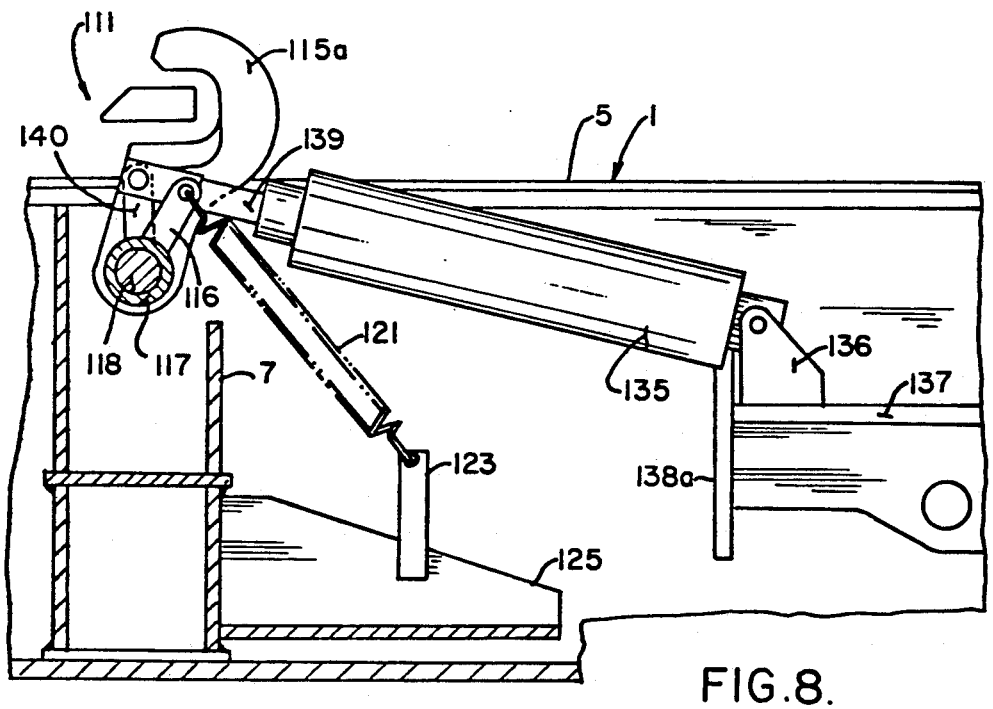
FIG. 8 is a view of the locking assembly taken along line 8—8 of FIG. 7.
Figures 7, 9, 10, 11:
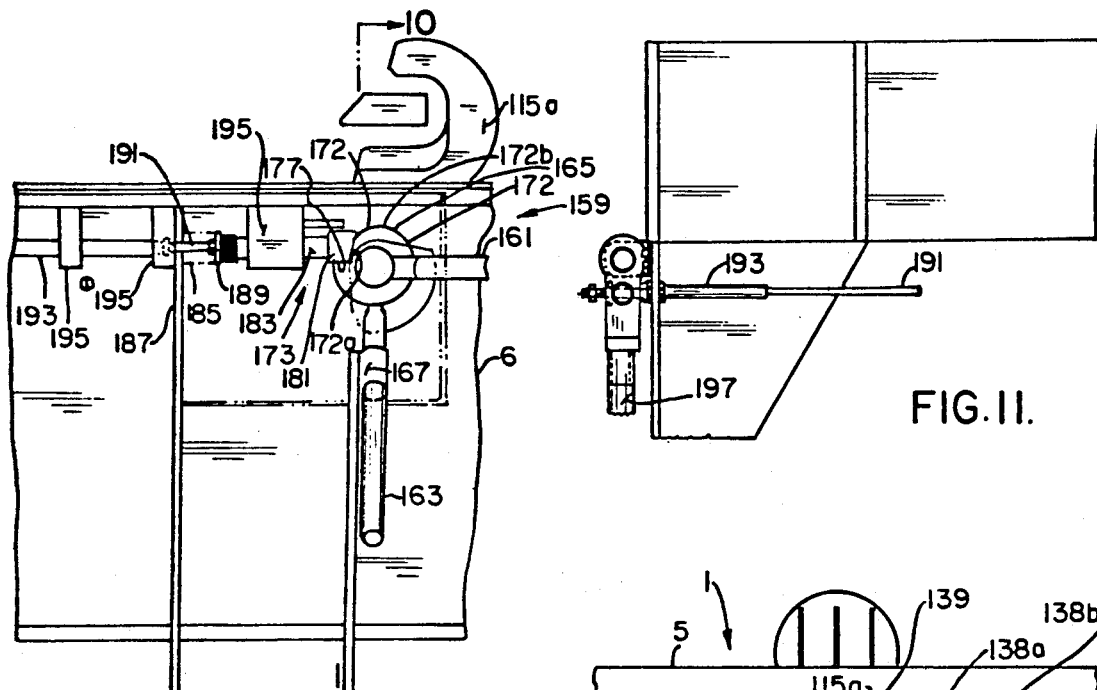
FIG. 7 is a top plan view of an alternate locking assembly of the present invention.
FIG. 9 is a side elevational view of the trailer, taken along line 9—9 of FIG. 7, showing the mechanical release mechanism of the locking assembly.
FIG. 10 is a front elevational view of the release mechanism taken along line 10—10 of FIG. 9.
FIG. 11 is a side elevational view of a forward portion of the release mechanism.

Turning to FIGS. 7 and 8, reference numeral 111 refers to a second embodiment of the locking mechanism of the present invention. Locking mechanism 111 includes a pair of J-shaped hooks 115a and 115b which are pivotally mounted on trailer 1 to swing upwardly to engage latch plates 13. Hooks 115a and 115b are fixed to a hollow cylindrical tube 117 extending between side rails 5 and 6 above one of cross beams 7. An axle 118, journaled within tube 117, extends through an aperture 119 in side rail 6. Axle 118 preferably extends beyond side rail 6. Hooks 115a and 115b pivot around axle 118 along a path parallel to the longitudinal axis of trailer 1 to engage latch plates 13 from the fronts thereof. Unlike hooks 15a and 15b, hooks 115a and 115b only cover the rear and tops of latch plates 13. Thus, they do not prevent forward motion of flatrack 9. Trailer 1 must, therefore, be equipped with front stops (not shown) to prevent forward movement of flatrack 9.

A spring arm 116 is mounted on tube 117 to the inside of hook 115a. A spring 121 is mounted at one end to spring arm 116 and, at its other end, to a spring tab 123 mounted on one of a pair of gussets 125.

A single acting cylinder 135, having a spring in a forward end thereof, is pivotally mounted to a pivot bracket 136. Bracket 136 is fixed to a shelf 137 on the inside of side rail 5. Shelf 137 is fixed to the inside of side rail 5 by a pair of support arms 138a and 138b. (See FIGS. 1 and 8). The cylinder's rod 139 is pivotally connected to an arm 140 fixed to tube 117 between spring arm 116 and hook 115a. Thus, when the cylinder's rear chamber 143 is pressurized, piston 135 extends outwardly and rotates hooks 115a and 115b upwardly into engagement with latch plates 13 to lock flatrack 9 to trailer 1. The spring in the forward end of cylinder 135 retracts cylinder rod 139 thereby releasing hooks 115a and 115b from engagement with latch plates 13 to unlock flatrack 9.

Referring to FIGS. 9-11, a manual release assembly 159 is located on the outside of side rail to release hooks 115a and 115b. Release mechanism 159 includes a main handle 161 fixed to the portion of axle 118 which extends beyond side rail 6. A pin 162 extends through handle 161 and axle 118 so that axle 118 will rotate as handle 161 is pivoted. A pin 160 extends through axle 118, tube 117, and into hook 115a so that axle 118, and hence main handle 161, is connected to hook 115a. Hook 115a, and hence hook 115b, thus pivot with handle 161. (FIG. 10)

Release mechanism 159 also includes a release handle 163 fixed to pair of cams 165 and 166 which rotate freely about axle 118. Release handle 163 is held in place by a clip bracket 167 which is mounted on a gusset 169 on the outside of side rail 6.

To release hooks 115a and 115b, main handle 161 is rotated clockwise, as seen in FIG. 9. To prevent accidental rotation of main handle 161 and thus release of hooks 115a and 115b, main handle 161 is locked in place by a cam 171 and a spring biased, lock-block assembly 173. Cam 171 is secured to axle 118 between cams 165 and 166 by a pin which extends through a pin hole 175 in cam 171 and axle 118. Lock-block assembly 173 butts up against a flat edge 179 of cam 171 to prevent clockwise rotation of cam 171 and, thus, of handle 161.

Lock-block assembly 173 includes a block 181 mounted on a rod 183. A spring 185 extends between a gusset 187 of trailer 1 and a flange 189 at the rear of rod 183. Spring 185 urges assembly 173 into contact with cam 171.

Cams 165 and 166 each include a shoulder 177 formed in a reduced diameter area 172a of cam surface 172. When lock-block assembly 173 is in contact with cam 171, it is resting on the shoulder 177. As cams 165 and 166 are rotated counter clockwise by release handle 163, an area of greater diameter 172b of cam surface 172 urges lock-block assembly 173 out of contact with cam 171 to allow rotation of main handle 161, as can be seen in FIG. 9.

A cable 191 is attached to lock-block assembly 173 and is carried to the front of trailer 1 in a hollow tube 193. (FIGS. 9 and 11) Tube 193 and lock-block assembly 173 are supported by a series of brackets 195. At the front of trailer 1, cable 191 is connected to a second release handle 197 which is pivotally mounted to the front of side rail 6. When release handle 197 is pivoted, it pulls lock-block assembly 173 out of contact with cam 171 thereby releasing main handle 161. Thus, main handle 161 can be rotated to disengage hooks 115a and 115b from latch plates 13. Thus, there are two points from which main handle 161 may be released.

Numerous variations within the scope of the appended claims will be apparent to those skilled in the art in light of the foregoing description and accompanying drawings.

Having thus described the invention, what is claimed and desired to be secured by Letters Patent is:

1. A palletized load system trailer which is removably connected to a truck having a supply of pressurized air and which carries a flatrack having at least one latch plate, said trailer including a pneumatic system which is detachably coupled to said truck's air supply to communicate therewith, means for automatically locking said flatrack to said trailer when said trailer is coupled to said truck's air supply, and means for manually overriding said locking means to release said flatrack from said trailer; said automatic locking means including:
   pivotal hook means which engage said at least one latch plate of said flat rack; and
   an air cylinder having an extendable, retractible piston operatively connected to said hook means such that when said air cylinder is pressurized, said piston extends and said hook means is pivoted into engagement with said latch plate, said cylinder being in communication with said trailer's pneumatic system.

2. The trailer of claim 1, wherein said air cylinder is a double acting cylinder having a rear chamber which when pressurized extends a rod of said cylinder to pivot said hook means into engagement with said at least one latchplate and a front chamber which when pressurized retracts said rod to disengage said hook means from said at least one latchplate, wherein said cylinder rear chamber is connected to an air line of said pneumatic system.

3. The trailer of claim 2, wherein an air tank communicates with said air line by a second air line having a check valve therein, wherein when said pneumatic system is connected to said truck air supply, said check valve allows said tank to become pressurized.

4. The trailer of claim 3, wherein said tank further communicates with said cylinder front chamber, there being a pilot valve between said tank and said front chamber, said pilot valve communicating with signal means which closes said pilot valve when said trailer pneumatic system is connected to said truck air supply, preventing communication between said tank and said cylinder front chamber.

5. The trailer of claim 4, wherein said pilot valve includes an opening means for opening said line of communication between said tank and said cylinder front chamber to pressurize said front chamber, thereby causing said hook means to disengage from said latch plate.

6. The trailer of claim 1, wherein said hook means comprises at least one J-shaped hook mounted to an axle rotatably journaled in said trailer transverse to the longitudinal axis of said trailer, said at least one hook preventing vertical movement of said flatrack.

7. The trailer of claim 6, said trailer further including aft stops to prevent rearward movement of said flatrack.

8. The trailer of claim 1, wherein said hook means comprises at least one arm, said arm having a fixed end, a free end, and a head at said free end, said head having an aperture therethrough shaped and sized to fit over said at least one latch plate, said aperture surrounding said latch plate upon engagement of said latch plate to prevent horizontal and vertical movement of said flatrack.

9. The trailer of claim 8, wherein said arm is pivotally mounted to said trailer to pivot in a path perpendicular to the longitudinal axis of said trailer.

10. The trailer of claim 9, wherein said release means comprises a cylinder having an extendable retractable piston, said cylinder being pivotally connected at an end remote from said piston to one of said arms, and said piston being pivotally connected to the other of said arms, whereby, when said cylinder piston is retracted, said hook means is pivoted out of engagement with said latch plate, and when said cylinder piston is extended, said hook means are pivoted into engagement with said latch plates.

11. A palletized load system trailer which is removably connected to a truck having a supply of pressurized air and which carries a flatrack having at least one latch plate, said trailer including a pneumatic system which is detachably coupled to said truck's air supply to communicate therewith, means for automatically locking said flatrack.

12. The trailer of claim 11, wherein said locking cam has a flat surface, said locking means comprising a rod which is spring biased to be normally in locking contact with said flat face of said locking cam.

13. The trailer of claim 12, wherein said release cam includes a cam surface having a section of reduced diameter and a section of enlarged diameter, said locking means being in contact with said reduced diameter section when it is in locking contact with said locking cam, such that as said release cam is rotated, said area of enlarged diameter comes into contact with said locking means and pushes said locking means out of engagement with said locking cam.

14. The trailer of claim 12, wherein said release means further includes a cable attached at one end to said locking means and attached at another end to a second release handle, said second release handle being pivotally secured to said trailer such that when said second release handle is pivoted, said locking means is pulled out of engagement with said locking cam, releasing said main handle so that it may be rotated to to disengage said hook means from said latch plate. to said trailer when said trailer is coupled to said truck's air supply, and manual release means for releasing said flatrack from said trailer;
   said automatic locking means including:
      pivotal hook means which engage said at least one latch plate of said flat rack; said hook means comprising at least one J-shaped hook mounted to an axle rotatably journaled in said trailer transverse to the longitudinal axis of said trailer, said at least one hook preventing vertical movement of said flatrack; and
      an air cylinder having an extendable, retractible piston operatively connected to said hook means such that when said air cylinder is pressurized, said piston extends and said hook means is pivoted into engagement with said latch plate, said cylinder being in communication with said trailer's pneumatic system;
   said manual release means comprising a main handle connected to said axle such that rotation of said main handle rotates said hook means, a locking cam fixed to said axle to rotate with said main handle, a release cam operated by a release handle and mounted on said axle for free rotation about said axle, and means for locking said main handle in place, whereby when said release cam is rotated, said locking means releases said locking cam, thereby allowing said main handle to rotate said hook means out of engagement with said latch plate.

15. A palletized load system trailer which is removably connected to a truck having a supply of pressurized air and which carries a flatrack having at least one latch plate, said trailer including a pneumatic system which is detachably coupled to said truck's air supply to communicate therewith, means for automatically locking said flatrack to said trailer when said trailer is coupled to said truck's air supply, and manual release means for releasing said flatrack from said trailer;

said automatic locking means including:

pivotal hook means which engage said at least one latch plate of said flat rack; said hook means comprising at least one arm pivotally mounted to said trailer to pivot in a path perpendicular to the longitudinal axis of said trailer, said arm having a fixed end, a free end, and a head at said free end, said head having an aperture therethrough shaped and sized to fit over said at least one latch plate, said aperture surrounding said latch plate upon engagement of said latch plate to prevent horizontal and vertical movement of said flatrack; and an air cylinder having an extendable, retractible piston operatively connected to said hook means such that when said air cylinder is pressurized, said piston extends and said hook means is pivoted into engagement with said latch plate, said cylinder being in communication with said trailer's pneumatic system;

said manual release means comprising a main handle pivotally connected to a toggle clamp mounted to said trailer, said toggle clamp including a rod which is movable between a retracted position and an extended position, whereby, when said handle is pivoted, said rod extends to push said hook means out of engagement with said at least one latch plate.

16. In an automatic, pneumatically operated, flatrack lockdown device which engages latchplates of a flatrack to lock said flatrack to a trailer, said lockdown device including hook means fixed to an axle rotatably carried on said trailer, the improvement comprising override means for overriding said pneumatically operated lockdown device to disengage said lockdown device from said flatrack, said override means comprising a main handle fixed to said axle to rotate therewith, said main handle rotating between a locked position and a release position such that when said main handle is rotated from said locked position to said release position said lockdown device is disengaged from said flatrack latchplates, means for locking said main handle in said locked position, and means for releasing said main handle from said locked position.

17. The improvement of claim 16, wherein said locking means comprises a locking cam fixed to said axle to rotate with said main handle and a locking assembly; said locking cam including a cam surface, said locking assembly being biased to normally engage said cam surface such that said main handle cannot rotate from said locked position to said release position.

18. The improvement of claim 17, wherein said release means includes a front release handle connected to said locking means and pivotally mounted to said trailer, whereby when said release handle is pivoted, said locking assembly is pulled out of engagement with said locking cam, allowing said main handle to be pivoted to a release position.

19. The improvement of claim 17, wherein said release means comprises a release cam pivotally mounted on said axle for free rotation thereabout, said release cam including a cam surface having an area of large diameter and an area of small diameter, said locking means being biased to be in contact with said area of small diameter when said main handle is in a locked position, such that when said release cam is rotated said area of large diameter comes into contact with said locking means to push said locking means out of engagement with said locking cam.

20. The improvement of claim 19, said release cam being pivoted by a cam handle.

21. The improvement of claim 19, said release means further including a front release handle connected to said locking means and pivotally mounted to said trailer, whereby when said release handle is pivoted, said locking assembly is pulled out of engagement with said locking cam, allowing said main handle to be pivoted to a release position.

22. In an automatic pneumatically operated flatrack lockdown assembly including hook means which engages latchplates of a flatrack to lock said flatrack to a trailer; the improvement comprising manually operated override means for overriding said pneumatically operated lockdown assembly to disengage said lockdown assembly from said flatrack, said override means comprising a main handle pivotally connected to a toggle clamp which is fixed to said trailer, and a extendable, retractable bar which extends upon pivoting said handle in one direction and retracts upon pivoting said handle in an opposite direction, such that when said bar is extended, it contacts said hook means of said lockdown assembly which engages said latchplates and pushes said hook means out of engagement with said latchplate.

23. The improvement of claim 22 wherein said hook means comprises a cut-out which receives said rod means.

* * * * *